United States Patent Office 3,433,808
Patented Mar. 18, 1969

3,433,808
FURFURYL ALCOHOL ISOMERIZATION
Robert E. Rinehart, Rutherford, N.J., assignor to Uniroyal, Inc., a corporation of New Jersey
No Drawing. Continuation-in-part of application Ser. No. 262,347, Mar. 4, 1963. This application Oct. 3, 1963, Ser. No. 313,424
U.S. Cl. 260—347.8   1 Claim
Int. Cl. C07d 5/10; B01j 11/82

ABSTRACT OF THE DISCLOSURE

This invention is directed to a method for the isomerization of certain monomeric olefinic cyclic compounds under mild condition of temperature and pressure by treatment with a rhodium salt.

---

This application is a continuation-in-part of my application Ser. No. 262,347, filed Mar. 4, 1963, now abandoned.

This invention relates to a new method for isomerizing certain monomeric olefinic cyclic compounds.

Isomerization of olefins often is conducted under conditions involving relatively high temperatures, as in the gas phase, or in the presence of large amounts of acids or bases [cf. Emmett, "Catalysis," vol. VI, Reinhold, New York (1958)]. Very often decomposition accompanies the isomerization, resulting in lowered yields. These methods, which require large amounts of heat or catalyst, are inefficient.

The present invention provides a simple method for the isomerization of certain olefinic compounds to useful isomers under mild conditions of temperature and pressure.

The monomeric olefinic cyclic compounds that may be isomerized by the process of the present invention are furfuryl alcohol, 2,5-dihydrothiophene 1,1-dioxide, and 1,3-cyclooctadiene, containing no vinyl group. According to the present invention, such compounds are isomerized by treatment with a rhodium salt.

In carrying out the present invention, either the monomeric olefinic cyclic compound to be isomerized is contacted with the rhodium salt directly as by dissolving the rhodium salt in the compound, or the isomerization may be carried out in a liquid medium as in water, or in an organic solvent such as ethanol, ethylene glycol, dimethylformamide, dimethyl sulfoxide, tetrahydrofuran, acetic acid. The time and temperature of treatment with the rhodium salt are not critical and generally will be from 1 hour to 10 days, at temperatures from 20° C. or below to 100° C., generally from 40° C. to 100° C. Higher temperatures can be used but offer no advantage and are often disadvantageous because the resultant increase in vapor pressure may require the use of pressure equipment.

The rhodium salts that may be used are the salts of conventional acids, such as rhodium chloride, bromide, iodide, sulfate, acetate, nitrate and the like. The amount of rhodium salt is not critical, and usually from 0.0001 to 10 mole percent based on the olefinic compound will be used.

The following examples illustrate the invention.

EXAMPLE 1

This example shows the isomerization of 2,5-di-hydrothiophene 1,1-dioxide to 2,3-dihydrothiophene 1,1-dioxide.

2,5-dihydrothiophene 1,1-dioxide, commonly called butadiene sulfone, is readily available from the addition of $SO_2$ to 1,3-butadiene. The isomer, 2,3-dihydrothiophene 1,1-dioxide is not readily available, requiring a synthesis of several steps from the 2,5-dihydro isomer. We can effect the conversion in one step, by the following procedure.

A solution of 0.5 g. of $RhCl_3 \cdot 3H_2O$ was dissolved in 100 ml. of ethanol. To this was added 10 g. of butadiene sulfone. The solution was placed in a bottle, which was then flushed with argon and sealed. The sample was heated at 50° for 3 days. The solution was then poured into water, and extracted several times with methylene chloride. The combined extracts were dried, then evaporated to dryness. A syrupy liquid remained which showed an infrared unsaturation band at 1600 cm.$^{-1}$, whereas the 2,5-isomer does not have a band at 1600 cm.$^{-1}$. Since a

absorption at about 1600 cm.$^{-1}$ can be expected for unsaturation conjugated with the group

the constitution of the product as 2,3-dihydrothiophene 1,1-dioxide is established.

Upon recrystallization from ether, white crystals were obtained melting at about 45° C., compared with literature value of 48–49° C.

EXAMPLE 2

This example shows the isomerization of furfuryl alcohol to 2,3-dihydro-2-furaldehyde.

A solution of 0.5 g. of $RhCl_3 \cdot 3H_2O$ was dissolved in 100 ml. of $H_2O$. To this was added 25 ml. of furfuryl alcohol in a 2-necked flask fitted with an inlet tube which dipped below the surface of the liquid, and also fitted with a condenser arranged for distillation. Steam was rapidly passed through the inlet tube. When the solution within the flask approached the boiling point, the clear solution turned rapidly cloudy, and a great amount of tar formed. About 200 ml. of $H_2O$ was distilled and collected. The aqueous distillate was cloudy. A small aliquot gave an immediate strong positive Tollen's reagent test for aldehyde (furfuryl alcohol gave a negative test). The cloudy distillate was extracted several times with ether. Upon standing, the ether solution slowly turned light yellow. The ether solution was dried over $MgSO_4$. The $MgSO_4$ was removed by filtration and the ether was then removed from the filtrate by distillation, and the product 2,3-dihydro-2-furaldehyde was collected; B.P. 59° C./3 mm., $$n_D^{26} = 1.4867$$

About 0.1 ml. of this isomerized product was added to ethanol. Water was added just to the cloud point. To this solution was added 0.2 ml. of phenylhydrazine and a drop of acetic acid. An immediate yellow precipitate proved the presence of a carbonyl compound. The yellow crystals decomposed quite rapidly when heated, and could not be recrystallized.

A solution of 100 grams of furfuryl alcohol, 200 ml. of water and 10 ml. of a 10% aqueous solution of $Rh(NO_3)_3 \cdot 2H_2O$ was treated and worked up in the same manner as the furfuryl alcohol solution treated with $RhCl_3 \cdot 3H_2O$ above. The product 2,3-dihydro-2-furaldehyde was analyzed by a Varian NMR spectroscope, which definitely showed the presence of an aldehyde group.

Such aldehydes may react with amines and phenols to form resins.

EXAMPLE 3

This example shows the isomerization of 1,3-cyclooctadiene to 1,5-cyclooctadiene.

A mixture of 2 grams of rhodium chloride trihydrate, 1 ml. of 1,3-cyclooctadiene and 20 ml. of absolute ethanol was heated at 50° C. for 24 hours. During this time an orange-colored solid formed in the reaction mixture. Separation of the solid material and recrystallization from glacial acetic acid yielded 1.24 grams of pure rhodium chloride-1,5-cyclooctadiene complex, identical in melting point and in the infrared spectrum with the bis (cycloöcta - 1,5-diene) mu,mu'-dichlorodirhodium reported by Chatt et al., J. Chem. Soc. 4735 (1957).

The recrystallized orange complex was suspended in 20 ml. of 10% aqueous KCN, in which it dissolved rapidly, giving a colorless solution containing a small amount of insoluble hydrocarbon. The hydrocarbon was extracted into pentane. The organic layer was dried over anhydrous $CaCl_2$, filtered, and concentrated by evaporation. Analysis by vapor phase chromatography revealed only one principal peak (in addition to pentane) at the retention time observed for 1,5-cycloöctadiene. The data indicated that the 1,5-cycloöctadiene was of greater than 99 mole percent purity; no 1,3-isomer was detected. The 1,5-cycloötadiene may also be recovered from the complex by similar treatment with other strong field ligands, such as other alkali-metal cyanides, alkali-metal thiocyanates, or organic phosphines, e.g. trialkyl phosphines, triphenyl phosphine.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of isomerizing furfuryl alcohol to 2,3-dihydro-2-furaldehyde which comprises treating said furfuryl alcohol with a rhodium salt.

References Cited

Rinehart, et al.: Journal of the Am. Chem. Soc. 84; 4145, November 1962.

HENRY R. JILES, *Primary Examiner.*

C. M. SHURKO, *Assistant Examiner.*

U.S. Cl. X.R.

260—332.1, 666